United States Patent
Gao

(10) Patent No.: US 10,643,468 B2
(45) Date of Patent: May 5, 2020

(54) TRAFFIC LIGHT CONTROL DEVICE, METHOD, AND SYSTEM

(71) Applicant: BOE TECHNOLOGY GROUP CO., LTD., Beijing (CN)

(72) Inventor: Jian Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/563,611

(22) PCT Filed: May 5, 2017

(86) PCT No.: PCT/CN2017/083198
§ 371 (c)(1),
(2) Date: Oct. 1, 2017

(87) PCT Pub. No.: WO2017/215365
PCT Pub. Date: Dec. 21, 2017

(65) Prior Publication Data
US 2019/0096242 A1   Mar. 28, 2019

(30) Foreign Application Priority Data
Jun. 12, 2016 (CN) .......................... 2016 1 0409007

(51) Int. Cl.
G08G 1/08 (2006.01)
G08G 1/087 (2006.01)
H04W 4/44 (2018.01)

(52) U.S. Cl.
CPC .............. G08G 1/087 (2013.01); G08G 1/08 (2013.01); H04W 4/44 (2018.02)

(58) Field of Classification Search
CPC ................................ G08G 1/087; H04W 4/44
(Continued)

(56) References Cited

U.S. PATENT DOCUMENTS 4,017,825 A * 4/1977 Pichey ................... G08G 1/087
340/13.25
5,990,808 A * 11/1999 Baer ...................... G08G 1/087
340/902
(Continued)

FOREIGN PATENT DOCUMENTS

CN           202694577 U       1/2013

OTHER PUBLICATIONS

International Search Report and Written Opinion dated Jul. 27, 2017 in PCT/CN2017/083198.
(Continued)

*Primary Examiner* — Omar Casillashernandez
(74) *Attorney, Agent, or Firm* — Syncoda LLC; Feng Ma

(57) ABSTRACT

A traffic light control method includes: receiving a crossing request from a vehicle approaching an intersection on a first road; determining whether traffic status at the intersection satisfies a crossing condition; and controlling the traffic light based on a determination result of the traffic status. A traffic light control device is configured to control a traffic light at an intersection, and includes a first receiving circuit, a processing circuit, and a control circuit. The first receiving circuit is configured to receive a crossing request from a vehicle approaching the intersection on a first road. The processing circuit is configured, upon the crossing request, to determine whether traffic status at the intersection satisfies a crossing condition, and to generate a control instruction based on a determination result of the traffic status. The control circuit is configured to control the traffic light based on the control instruction.

28 Claims, 12 Drawing Sheets

(58) Field of Classification Search
USPC .......................................................... 340/906
See application file for complete search history.

(56) References Cited

U.S. PATENT DOCUMENTS

| | | | | |
|---|---|---|---|---|
| 6,556,148 B2* | 4/2003 | Ellis | ...................... | A61H 3/061 |
| | | | | 340/906 |
| 6,609,061 B2* | 8/2003 | MacPhail | ............. | G08G 1/0104 |
| | | | | 340/906 |
| 9,595,193 B1* | 3/2017 | Duale | ................ | G01C 21/3676 |
| 2007/0273552 A1* | 11/2007 | Tischer | .................... | G08G 1/01 |
| | | | | 340/910 |
| 2008/0094250 A1* | 4/2008 | Myr | ........................ | G08G 1/04 |
| | | | | 340/909 |
| 2009/0256722 A1* | 10/2009 | Mase | ....................... | G08G 1/07 |
| | | | | 340/907 |
| 2011/0115645 A1* | 5/2011 | Hall | ....................... | G08G 1/087 |
| | | | | 340/907 |
| 2015/0243165 A1* | 8/2015 | Elsheemy | ............... | B60R 25/00 |
| | | | | 340/906 |
| 2016/0148507 A1* | 5/2016 | Pittman | ................ | H04W 4/029 |
| | | | | 340/917 |
| 2016/0200334 A1* | 7/2016 | Hilleary | ................ | G08G 1/097 |
| | | | | 246/218 |
| 2017/0032670 A1* | 2/2017 | Poornachandran | ......................... | |
| | | | | G08G 1/096716 |

OTHER PUBLICATIONS

1st Office Action dated Nov. 25, 2016 in CN201610409007.8.
2nd Office Action dated Feb. 28, 2017 in CN201610409007.8.
3rd Office Action dated Jul. 4, 2017 in CN201610409007.8.

* cited by examiner

TRAFFIC LIGHT CONTROL DEVICE, METHOD, AND SYSTEM

CROSS-REFERENCE TO RELATED APPLICATION

The present application claims priority to Chinese Patent Application No. 201610409007.8 filed on Jun. 12, 2016, the disclosure of which is hereby incorporated by reference in its entirety.

TECHNICAL FIELD

The present disclosure is related generally to traffic control technologies, and more specifically to a traffic light control method, a traffic light control device, and a traffic light control system.

BACKGROUND

Currently, traffic in cities is mainly controlled by means of a plurality of traffic lights that are arranged at intersections of traffic roads. Specifically, maintenance of the order of traffic at the intersections is realized by an approach of timing diversion, whereby vehicles on one direction are controlled to be in a "waiting" state, whereas vehicles on another direction are controlled to be in a "driving" state, so as to keep the traffic order on the roads.

In the method of controlling the traffic lights utilizing the above approach of timing diversion, issues may arise when the traffic condition changes, where the traffic lights are not controlled in correspondence to the traffic condition.

For example, an issue can occur during special periods of time such as during night, when there are fewer vehicles and pedestrians moving on the traffic roads. Under the control of the above control method, when the vehicles moving on a first road arrive at an intersection, they still need to comply with the instructions of traffic lights and thus may be in the "waiting" state even if there are no pedestrians walking on a second road that crosses the first road at the intersection.

As such, the traffic lights arranged at the intersections are not controlled based on the traffic condition, which cause the traffic lights do not match the traffic condition, resulting in increased fuel consumption for the vehicles and waste of time for the drivers of the vehicles.

SUMMARY

In order to address the issues associated with current traffic control technologies, the present disclosure provides a traffic light control device, a traffic light control method, and a traffic light control system.

In a first aspect, the disclosure provides a traffic light control method. The method is configured for controlling a traffic light at an intersection.

The method comprises:

receiving a crossing request from a vehicle approaching the intersection on a first road;

determining whether traffic status at the intersection satisfies a crossing condition; and controlling the traffic light based on a determination result of the traffic status.

Herein the step of controlling the traffic light based on a determination result of the traffic status can comprise: controlling the traffic light to allow the vehicle to pass through the intersection on the first road if the traffic status at the intersection satisfies the crossing condition.

As such, the controlling the traffic light to allow the vehicle to pass through the intersection on the first road if the traffic status at the intersection satisfies the crossing condition can comprise: maintaining the traffic light as green if the traffic light is green; or altering the traffic light to become green if the traffic light is red.

Alternatively, the step of controlling the traffic light based on a determination result of the traffic status can comprise: alerting the traffic light to flash if the traffic status at the intersection fails to satisfy the crossing condition.

In the method, the crossing request can be transmitted from the vehicle via optical communication, and as such, the receiving a crossing request from a vehicle approaching the intersection on a first road can comprise:

detecting an optical signal transmitted from the vehicle; and determining the crossing request based on the optical signal.

Herein besides the optical communication, the crossing request can be transmitted from the vehicle via a wireless communication. The wireless communication can be any one or a combination of Bluetooth, infrared transmission, or wireless local area network (LAN) transmission, etc.

In some embodiments of the method, the detecting an optical signal transmitted from the vehicle comprises: detecting a light emitted from at least one headlamp of the vehicle; and the determining the crossing request based on the optical signal comprises: determining the crossing request based on the light, wherein a twinkle frequency of the light corresponds to the crossing request.

According to some embodiments of the method, the crossing request comprises a modulated signal, and as such, between the receiving a crossing request from a vehicle approaching the intersection on a first road and the determining whether traffic status at the intersection satisfies a crossing condition, the method further comprises: demodulating the crossing request.

In the method as described above, the traffic status can comprise at least one of: traffic flow data on a second road crossing the first road at the intersection; traffic block data on the first road passing the intersection; or instant time.

In embodiments where the traffic status comprises traffic flow data on a second road crossing the first road at the intersection, the determining whether traffic status at the intersection satisfies a crossing condition comprises: determining whether the traffic flow data is lower than, or equal to, a flow threshold.

In embodiments where the traffic status comprises traffic block data on the first road passing the intersection, the determining whether traffic status at the intersection satisfies a crossing condition comprises: determining whether there is a traffic block on the first road passing the intersection.

In embodiments where the traffic status comprises instant time, the determining whether traffic status at the intersection satisfies a crossing condition comprises: determining whether the instant time is within a time window.

In a second aspect, the present disclosure further provides a traffic light control device.

The traffic light control device is configured to control a traffic light at an intersection, and comprises a first receiving circuit, a processing circuit, and a control circuit.

The first receiving circuit is configured to receive a crossing request from a vehicle approaching the intersection on a first road. The processing circuit is configured, upon the crossing request, to determine whether traffic status at the intersection satisfies a crossing condition, and to generate a control instruction based on a determination result of the traffic status. The control circuit is configured to control the traffic light based on the control instruction.

In some embodiments of the traffic light control device, the control instruction generated by processing circuit comprises a crossing instruction if the traffic status at the intersection satisfies the crossing condition. The crossing instruction is configured to allow the vehicle to pass through the intersection.

As such, the control circuit is configured to maintain the traffic light as green if the traffic light is green; and to alter the traffic light to become green if the traffic light is red, based on the crossing instruction.

In some other embodiments of the traffic light control device, the control instruction generated by processing circuit comprises an alerting instruction if the traffic status at the intersection fails to satisfy the crossing condition. The alerting instruction is configured to alert vehicles.

According to one embodiment of the traffic light control device, the control circuit is configured to alert the traffic light to flash based on the alerting instruction.

In some embodiments of the traffic light control device, the first receiving circuit comprises an optical sensing sub-circuit, which is configured to detect an optical signal transmitted from the vehicle to thereby obtain the crossing request.

In a preferred embodiment, the optical signal transmitted from the vehicle comprises a light emitted from at least one headlamp of the vehicle, wherein a twinkle frequency of the light corresponds to the crossing request.

In some embodiments, the traffic light control device further comprises a signal demodulating circuit, which is configured to demodulate the crossing request to thereby generate a demodulated crossing request after detecting the optical signal and before processing by the processing circuit.

The traffic light control device can further include a data retrieving circuit, which is configured to retrieve data of the traffic status at the intersection from a server. Herein the server can be a remote server, or can be a local server.

In a third aspect, the present disclosure further provides a traffic light control system. The traffic light control system can comprise a traffic light control device according to any of the embodiments as described above.

According to some embodiments of the disclosure, the traffic light control system further comprises a signal processing device, which can be mounted on the vehicle and can be configured to receive the crossing request from a user and to transmit the crossing request to the traffic light control device.

In some embodiments of the traffic light control system, the signal processing device comprises: a second receiving circuit, which is configured to receive the crossing request from the user; and a transmitting circuit, which is configured to transmit the crossing request to the traffic light control device.

According to some embodiments of the disclosure, the traffic light control system further includes a user terminal, which is configured for the user to send the crossing request to the signal processing device.

In some embodiments of the traffic light control system, the signal processing device further comprises a signal modulating circuit, which is configured to modulate the crossing request to thereby generate a modulated crossing request before transmission by the transmitting circuit.

In the traffic light control system, the transmitting circuit can include an optical signal controller, which is configured to control an optical signal transmitted from the vehicle. Herein the optical signal encodes the crossing request.

The optical signal controller can comprise a headlamp controller, which is configured to control a light emitted from at least one headlamp of the vehicle to twinkle at a twinkle frequency. Herein the twinkle frequency corresponds to the crossing request.

According to some embodiments of the disclosure, the traffic light control system further includes a server, which is configured to store the traffic status. As such, the traffic light control system can further comprise a data collector, each configured to collect data of the traffic status at the intersection and to transmit the traffic status to the server. Herein the server can be a remote server, or can be a local server. The server can be in a cloud.

Herein the term "traffic light" can be interchangeable with "traffic signal", "traffic lamps", "traffic control signals", and refers to a signaling device which is positioned at a road intersection, a pedestrian crossing, other location, etc., and is configured to control flows of traffic.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiment. For those of ordinary skill in the art, other drawings of other embodiments can become apparent based on these drawings.

DETAILED DESCRIPTION

In the following, with reference to the drawings of various embodiments disclosed herein, the technical solutions of the embodiments of the disclosure will be described in a clear and fully understandable way.

It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

In order to address the issues of current traffic control technologies that the traffic lights are not controlled to alter based on the traffic condition, the present disclosure provides a traffic light control method, a traffic light control device, and a traffic light control system.

In a first aspect, a traffic light control method is disclosed. The method is used for controlling a traffic light at an intersection, and comprises the following steps:

receiving a crossing request from a vehicle approaching the intersection on a first road;

determining whether traffic status at the intersection satisfies a crossing condition; and controlling the traffic light based on a determination result of the traffic status.

Figure 1:
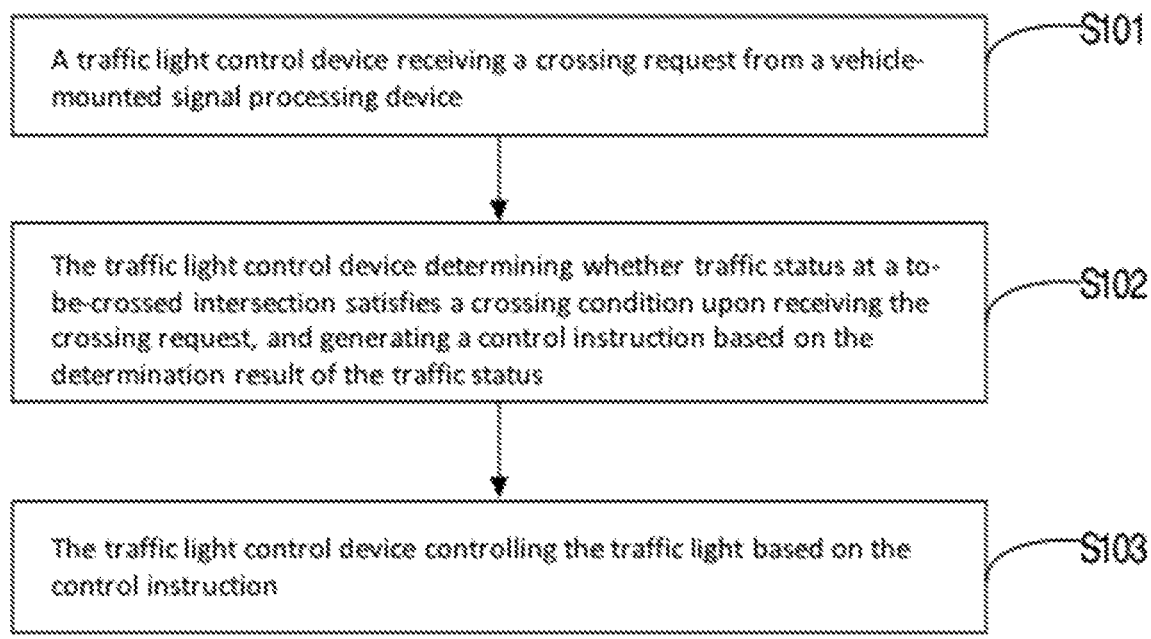
FIG. 1 is a flow chart of a traffic light control method according to some embodiments of the present disclosure.

FIG. 1 illustrates a flow chart of a traffic light control method according to some embodiments of the present disclosure.

As shown in FIG. 1, the traffic light control method comprises the following steps: S101-S103.

S101: a traffic light control device 100 (such as the one shown in FIG. 2) receiving a crossing request from a vehicle-mounted signal processing device 200.

Herein the traffic light control device 100 can be disposed over a traffic light 10, and the vehicle-mounted signal processing device 200 can be mounted on a vehicle 20 moving on the road.

Herein the vehicle-mounted signal processing device 200 can have multiple embodiments. Specifically, the vehicle-mounted signal processing device 200 can be a part that is integrated into an existing device of the vehicle, or can be an independent part that is mounted on the vehicle. For example, the vehicle-mounted signal processing device 200 can be integrated into an internally disposed device, such as a navigation device, a reverse video device, an audio device, etc. of the vehicle. Alternatively, the vehicle-mounted signal processing device 200 can be an independent device that is mounted over a control console, an air outlet, etc. of the vehicle 20. There are no limitations herein.

Herein the crossing request is referred to as a request sent by, and transmitted from, a vehicle to cross an intersection of roads or a road section where the traffic light 10 is mounted.

Because the vehicle-mounted signal processing device 200 is mounted on a vehicle, the vehicle-mounted signal processing device 200 thus changes its position along with the vehicle 20 when the vehicle 20 is moving, i.e., the position of the vehicle-mounted signal processing device 200 is moving and not fixed. As such, the crossing request from the vehicle-mounted signal processing device 200 can be preferably transmitted to the traffic light control device 100 via a wireless transmission.

S102: the traffic light control device 100 determining whether traffic status at a to-be-crossed intersection A satisfies a crossing condition upon receiving the crossing request, and generating a control instruction based on the determination result of the traffic status.

Figure 2:
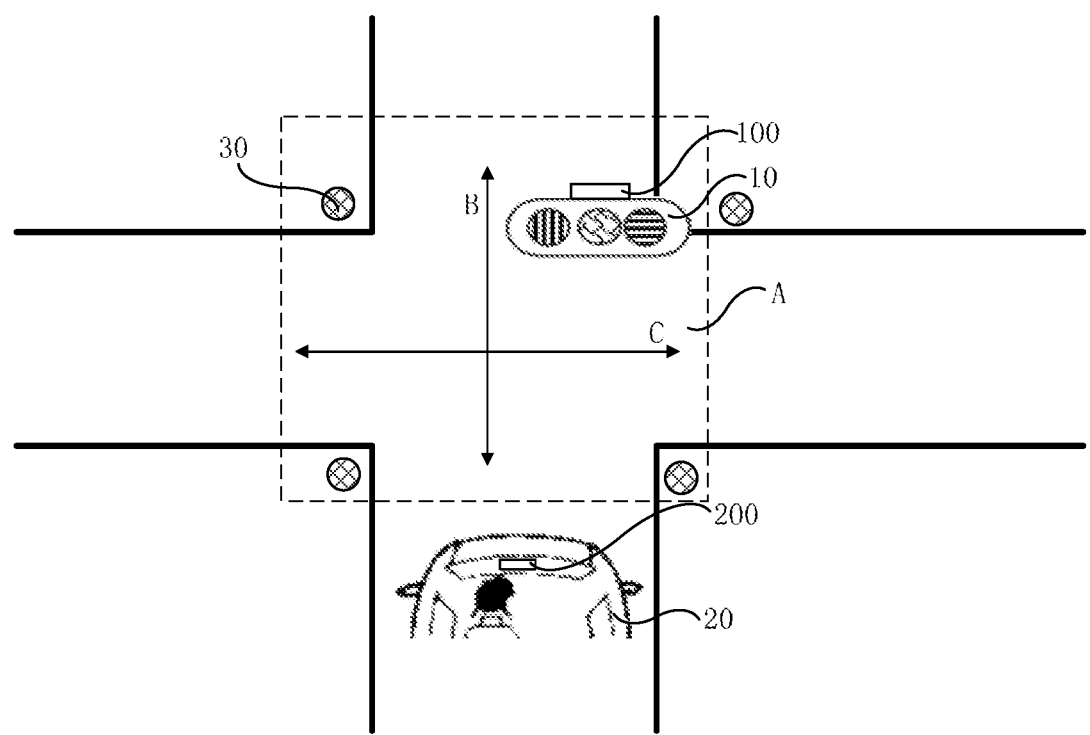
FIG. 2 illustrates a traffic light control device and a vehicle-mounted signal processing device as implicated in FIG. 1 according to some embodiments of the present disclosure.

Herein the to-be-crossed intersection A can be any intersection that a driver of the vehicle is about to cross and is illustrated in FIG. 2. However, the to-be-crossed intersection A can also be a road section (i.e. a segment on the road) where the traffic light 10 is mounted. There are no limitations herein.

The traffic status can include road condition data, and can include data regarding traffic flow of vehicles/pedestrians (i.e. traffic flow data), data regarding a traffic block (e.g. data of road construction enclosing wall), or an instant time (i.e. the time of driving), etc.

The crossing condition can be a condition which allows the vehicle to cross the to-be-crossed intersection A that is set in advance by a traffic management agency, and is configured to permit the crossing of the vehicle through the to-be-crossed intersection A if the crossing condition is satisfied upon the crossing request.

The crossing condition can be adjusted based on practical needs. For example, an intersection of roads in a proximity of a school campus may have a much lower traffic flow during breaks of semesters (such as a winter break, a summer break, a spring break, and a fall break). The crossing condition at the intersection can thus be adjusted in accordance to the seasonal change of traffic flow.

Additionally, different intersections may have a different level of significance at different time points, and thus may be configured such that their crossing conditions have different priorities for vehicles to pass through depending on different levels of significance and different time points. It is also possible to adjust the crossing condition for a particular intersection depending on whether there are special occasions or situations.

Herein the control instruction can be a crossing instruction if the traffic status at a to-be-crossed intersection A satisfies the crossing condition. The control instruction can optionally be an alerting instruction if the traffic status at a to-be-crossed intersection A fails to meet the crossing condition S103: the traffic light control device 100 controlling the traffic light based on the control instruction.

Herein the traffic light control device 100 can control the traffic light to allow the vehicle to pass through the intersection if a crossing instruction is received. As such, the traffic light control device 100 can control the traffic light to maintain as green if the traffic light is originally green or control the traffic light to become green if the traffic light is originally red. In either case, the traffic light can allow the vehicle to pass through the intersection upon receiving the crossing instruction.

Taken above together, upon receiving a crossing request from a vehicle-mounted signal processing device disposed on a vehicle, a traffic light control device disposed on a traffic light at an intersection can analyze a traffic status at the intersection, which comprises information regarding the traffic condition (such as traffic flow of vehicles/pedestrians, traffic block data, and an instant time of driving, etc.); and if the traffic status satisfies the crossing condition, the traffic light control device can then control the traffic light to allow the vehicle to pass through the intersection via a crossing instruction (e.g. to control the traffic light to maintain green if it is originally green, or to control the traffic light to alter to green if it is originally red).

As such, control of the traffic light based on the traffic status can be realized by means of the traffic light control device as described above, which can increase the extent to which the traffic light matches the traffic status, in turn resulting in shortened waiting time period and reduced fuel consumption.

Depending on the different types of the traffic status, various embodiments of the traffic light control method are possible, and are described in the following in detail.

In a first embodiment of the traffic light control method, the traffic status can be traffic flow data.

The traffic flow data can include information of vehicles or pedestrians moving on a second road (having a direction C) which crosses the driving road (having a driving direction B) at the to-be-crossed intersection A, as illustrated in FIG. 2.

Herein the driving road is the road on which the vehicle is moving, and the driving direction is the direction to which the vehicle is driving. The second road can cross the driving road at a cross intersection, a Y intersection, a T-junction, a straight road with a marked or unmarked crosswalk, or other types of intersections.

Any road that allows vehicle/pedestrian moving at a direction different than the driving road can be regarded as a second road crossing the driving road so long as a traffic light is arranged at an intersection of the second road and the driving road. There are no limitations herein.

Figure 3:
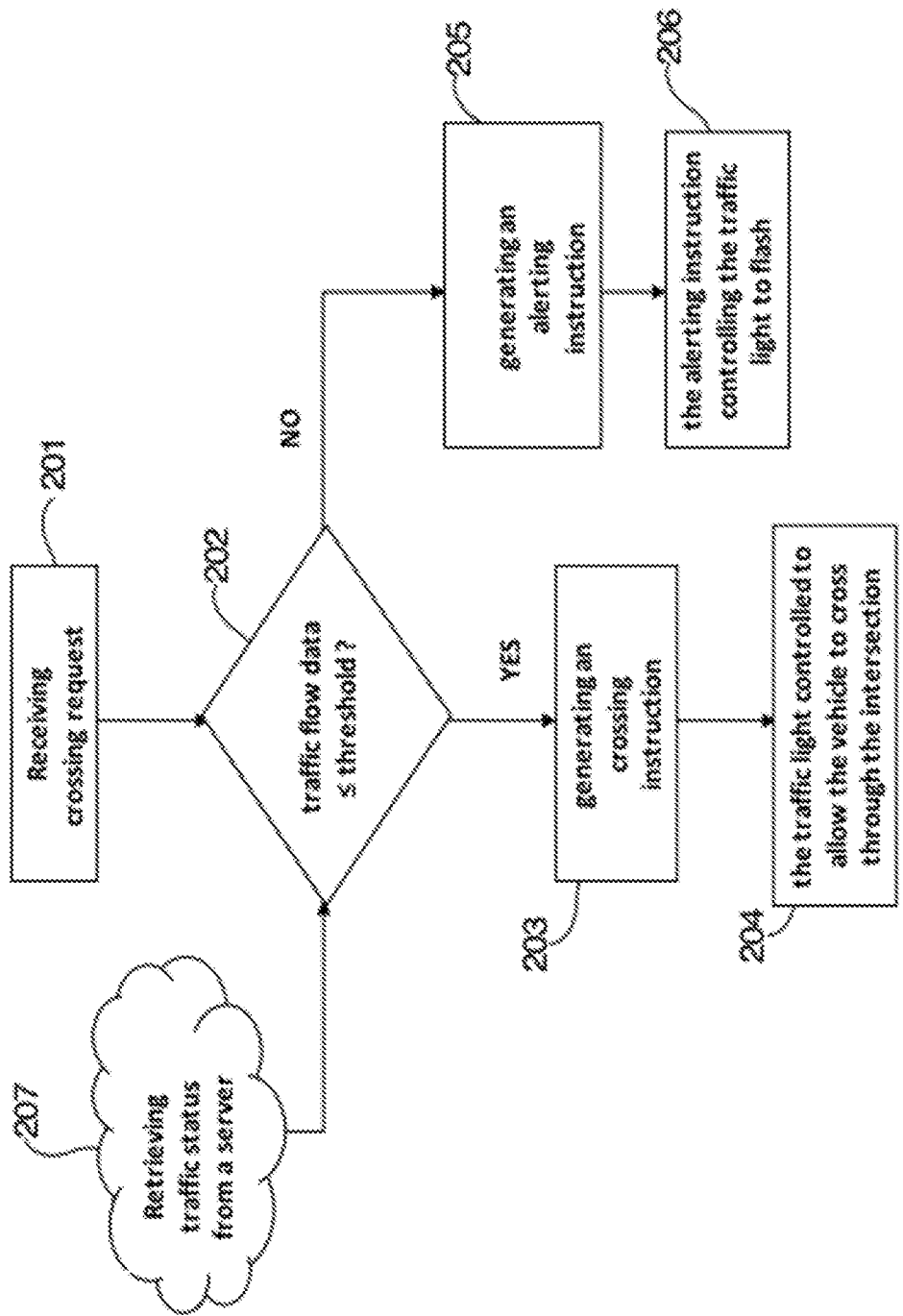
FIG. 3 is a flow chart of the traffic light control method illustrated in FIG. 1 where the traffic status comprises traffic flow data.

In this first embodiment, the traffic light control method can have the following steps, as illustrated in FIG. 3.

S201: Receiving the crossing request;

Herein S201 can be realized by performing S101, wherein the crossing request from the vehicle-mounted signal processing device 200 can be transmitted to the traffic light control device 100 via a wireless communication.

The above wireless communication can be any of Bluetooth, infrared transmission, or wireless local area network (LAN) transmission, etc. There are no limitations herein.

Figure 4A:
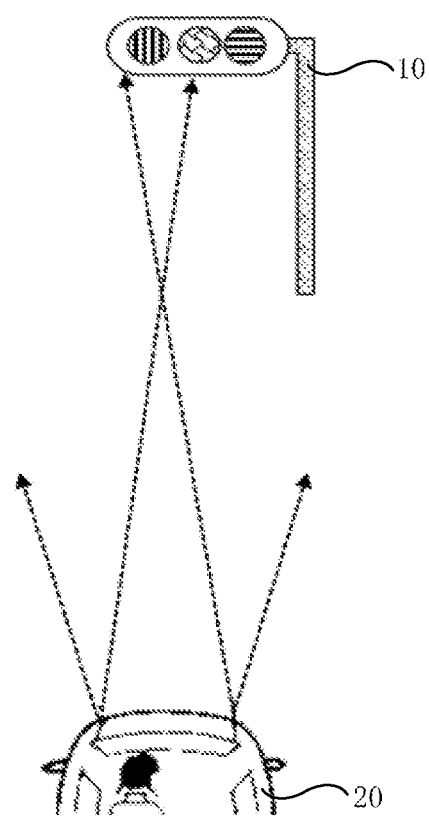
FIG. 4A is a schematic diagram illustrating the headlamps of a vehicle transmitting a crossing request.

Alternatively, the wireless communication can be an optical communication as illustrated in FIG. 4A. When a driver is driving a vehicle during night, the traffic light control device 100 can detect a twinkle frequency of light emitted by the headlamps of the vehicle 20, wherein the twinkle frequency corresponds to the crossing request.

As such, the traffic light control device 100 can comprise a sub-device configured for optical sensing (i.e. optical sensing sub-device, which can detect/sense optical signals), such as an optical sensor, a CMOS camera, etc., through which the twinkle frequency of the light emitted by the headlamps of the vehicle 20 can be detected by the traffic light control device 100 to thereby obtain a corresponding crossing request.

It is noted that in order to reduce or avoid the influence on regular lighting of the headlamps of the vehicle 20, the twinkle frequency of the headlamps of the vehicle 20 can preferably be set as higher than 100 Hz, which allows human eyes unable to sense the twinkling of the light emitted by the headlamps.

Figure 4B:
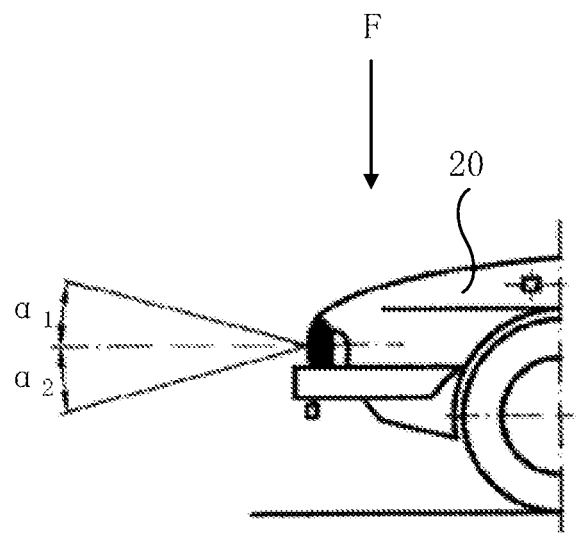
FIG. 4B shows an illumination range of the headlamps of a vehicle according to some embodiments of the present disclosure.
Figure 4C:
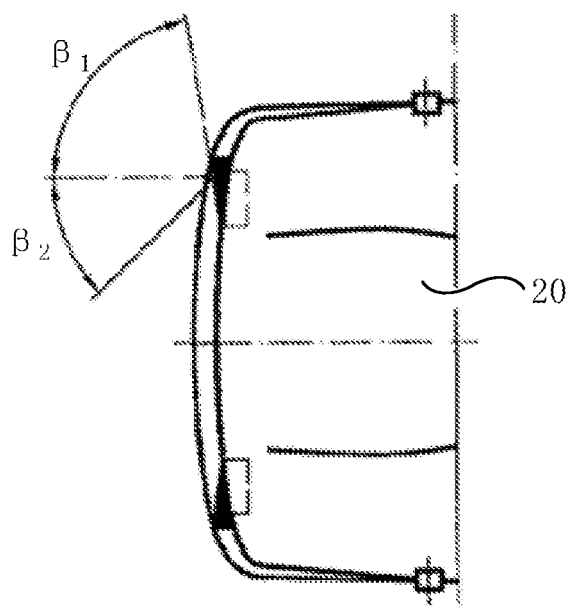
FIG. 4C shows an illumination range of the headlamps of a vehicle according to some other embodiments of the present disclosure.

In addition, the lighting range of the headlamps of the vehicle 20 shall also meet the current rules or conventions for vehicle management and vehicle safety. As such, the upward emitting angle α1 of the light emitted by the headlamps of the vehicle 20 can be around 15°; the downward emitting angle α2 of the light emitted by the headlamps of the vehicle 20 can be around 10°, as shown in FIG. 4B. The outward emitting angle β1 of the light emitted by the headlamps of the vehicle 20 can be around 45°; and the inward emitting angle β2 of the light emitted by the headlamps of the vehicle 20 can be around 10°, as shown in FIG. 4C.

It is further noted that to ensure that the traffic light control device 100 can detect the twinkle frequency of the light emitting from the headlamps of the vehicle 20, a height of the traffic light control device 100 disposed on the traffic light 10 can be adjusted such that the light emitted by the headlamps of the vehicle 20, if within the lighting range as mentioned above, can reach the aforementioned optical sensing sub-device in the traffic light control device 100 that is configured to detect the twinkle frequency of the light emitted from the headlamps of the vehicle 20.

Herein the twinkle frequency corresponding to the crossing request refers to that a different crossing request corresponds to a different twinkle frequency. For example, if the crossing request is configured to alter the traffic light 10 to become green, the twinkle frequency of the light emitting from the headlamps of the vehicle 20 can be correspondingly set as between 150 Hz and 250 Hz.

On the above basis, if the crossing request is further configured to deliver a "straight moving request", the twinkle frequency of the light emitting from the headlamps of the vehicle 20 can be set as between 150 Hz and 185 Hz; if the crossing request is further configured to deliver a "left turn request", the twinkle frequency of the light emitting from the headlamps of the vehicle 20 can be set as between 190 Hz and 225 Hz; and if the crossing request is further configured to deliver a "right turn request", the twinkle frequency of the light emitting from the headlamps of the vehicle 20 can be set as between 230 Hz and 250 Hz.

If the vehicle is a special vehicle, such as an ambulance vehicle or a fire truck, and the vehicle passes the to-be-crossed intersection A, the vehicle can transmit a crossing request, configured to alter the traffic light 10 to become red such that all four directions of the road connecting the to-be-crossed intersection A are prohibited for passing by other vehicles to ensure a smooth crossing/passing of the special vehicle. As such, if the above crossing request is configured to alter the traffic light 10 to become red, the twinkle frequency of the light emitting from the headlamps of the vehicle 20 can be correspondingly set as between 300 Hz and 350 Hz.

It should be noted that the above are just illustrating examples, and do not impose limitations to the present disclosure.

It is further noted that besides the embodiment that the crossing request is communicated from the vehicle to the traffic light control device via a light emitted by headlamps of the vehicle 20, wherein the twinkle frequency of the light corresponds to the crossing request, it is also possible that an optical signal transmitting sub-device, an independent equipment (other than the headlamps) mounted on the vehicle that is configured to transmit the crossing request to the traffic light control device, wherein a twinkle frequency of the optical signal corresponds to the crossing request.

In order to ensure a satisfactory transmission effect of the crossing request from the vehicle-mounted signal processing device 200 to the traffic light control device 100, preferably the crossing request can be modulated before transmission from the vehicle-mounted signal processing device 200.

Specifically, in one example, a baseband signal can be converted into a transmission signal by digital modulation. During this process, after an analog signal is sampled and quantified, the optical carrier can be modulated by binary digital signal "1" or "0" to thereby generate a pulse code, which ensures an improved anti-interference for the transmission signal.

The above digital modulation can be through any one of amplitude shift keying (ASK), frequency shift keying (FSK), or phase shift keying (PSK). The on-off keying (OOK) or binary ASK (2ASK) can be regarded as a special type of the ASK digital modulation.

Taken ASK digital modulation as one example, if the crossing request is configured to alter the traffic light 10 to become green, the crossing request can be in the form of "1-1". In the modulation process, a signal emitting source in the vehicle-mounted signal processing device 200 can continuously emit a carrier with a high amplitude to thereby represent "1-1". As such, upon receiving the "1-1" signal, the headlamps of the vehicle 20 can twinkle the light at 150 Hz-250 Hz.

If the crossing request is configured to alter the traffic light 10 to become red, the crossing request can be in the form of "1-0". In the modulation process, the signal emitting source in the vehicle-mounted signal processing device 200 can emit a first carrier with a high amplitude to thereby represent "1" and can emit a second carrier with a low amplitude to thereby represent "0". As such, upon receiving the "1-0" signal, the headlamps of the vehicle 20 can twinkle the light at 300 Hz-350 Hz.

If the crossing request is configured to alter the traffic light 10 to become yellow, the crossing request can be in the form of "0-0". In the modulation process, the signal emitting source in the vehicle-mounted signal processing device 200 can continuously emit a carrier with a low amplitude to thereby represent "0-0". As such, upon receiving the "0-0" signal, the headlamps of the vehicle 20 can twinkle the light at 400 Hz-420 Hz.

It is noted that for convenience, the crossing request is illustrated in the following by the example where the crossing request is configured to alter the traffic light 10 to become green.

It is further noted that besides digital modulation, the crossing request can also be modulated by analog modulation, which can comprise any one of amplitude modulation (AM), frequency modulation (FM), or phase modulation (PM). Among the above, pulse width modulation can be considered one type of phase modulation (PM).

S202: determining whether the traffic flow data is lower than, or equal to, a flow threshold.

Specifically, if the traffic status comprises traffic flow data comprising information of vehicles or pedestrians moving on a second road (having a direction C) which crosses the driving road (having a driving direction B) at the to-be-crossed intersection A, the traffic light control device 100 can determine whether the traffic status at the to-be-crossed intersection A meets a crossing condition (i.e. the traffic flow data is lower than, or equal to, a flow threshold), and can execute step S203 (shown below) if the traffic status at the to-be-crossed intersection A meets the crossing condition.

Herein the flow threshold can be set based on the traffic condition on the roads. For example, at intersections having a relatively low traffic flow (i.e. relatively low number of crossing vehicles/pedestrians) during the day, the flow threshold can be set as a relatively bigger number. The flow threshold can be set as 0 during the night when drivers do not have good visions, and under such circumstances, even if the traffic flow data is equal to the flow threshold, i.e. there are no vehicles/pedestrians on the second road (having a direction C) which crosses the driving road (having a driving direction B), or there are no moving objects, the crossing condition is met.

In S201, the vehicle-mounted signal processing device 200 modulates the crossing request before transmission of the crossing request to the traffic light control device 100, and thus prior to S202, the traffic light control device 100 needs to demodulate the modulated crossing request to reduce the transmission signal to the baseband signal to thereby allow subsequent processing of the baseband signal.

In addition, prior to S202, the traffic light control device 100 can also execute step S207: retrieving the traffic status at the to-be-crossed intersection A from a server.

Herein the server can be a remote server disposed remotely at a traffic management agency, or can be in a cloud. The server can also be a local server, where the traffic status at the to-be-crossed intersection A can be stored. For example, the traffic light control device can be connected to a computer (or a computing device) that is locally disposed, which can be specifically configured to store the traffic status.

Regardless, the traffic status (i.e. the traffic flow data at the to-be-crossed intersection A) need to be collected in advance through at least one data collector 30, which can be disposed, and configured to collect the traffic status, at the to-be-crossed intersection A.

As such, the at least one data collector 30 can be arranged such that one data collector 30 is disposed at each corner of the to-be-crossed intersection A. In order to improve the accuracy of the traffic status, more than one data collector 30 can be disposed at each corner of the to-be-crossed intersection A. There are no limitations herein.

The data collector 30 can be a camera, a radar collector, or an ultrasonic collector. There are no limitations herein. For example, if moving living objects are the primary target in collecting the traffic status at the to-be-crossed intersection A, an infrared camera can be preferably utilized.

Correspondingly, an infrared filter can be arranged inside the infrared camera, and the infrared filter is actuated during the day to block infrared lights from entering the camera, so that the camera can only detect visible lights. During the night or under a poor lighting condition, the infrared filter stops working, such that the infrared light emitted from the infrared camera can hit the moving living objects (e.g. pedestrians) before reflection, and then the reflected infrared lights can form images in the infrared camera. Thereby the accuracy for detecting the traffic status during the night can be effectively improved.

Figure 5:
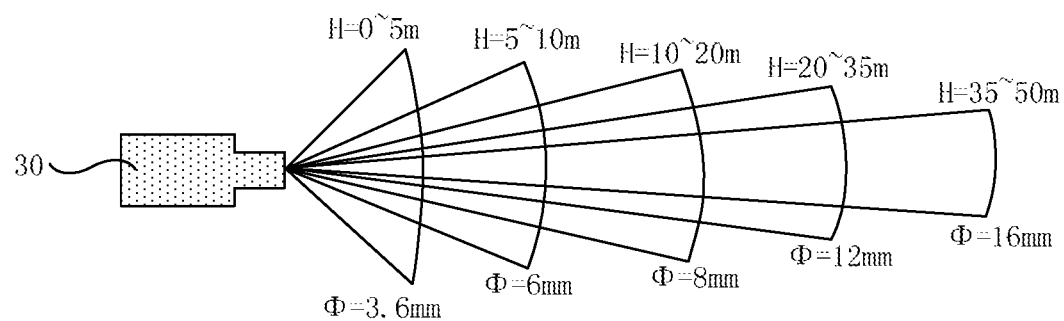
FIG. 5 is a schematic diagram illustrating the relationship between a diameter and a detection range of the camera as shown in FIG. 2.

On the above basis, the bigger the diameter Φ the lens in the camera, the larger the detection range H. As shown in FIG. 5, the detection range H can be 0 m-5 m if the diameter Φ of the lens of the camera (i.e. the data collector 30) is 3.6 mm; whereas the detection range H can be 35 m-50 m if the diameter Φ of the lens of the camera is 16 mm. Thus a camera having a relatively big diameter Φ of the lens can preferably be disposed to collect the traffic flow data at the intersections to thereby improve the safety and reliability of the traffic light control method as disclosed herein.

Based on the determination result of the traffic flow, the traffic light control device 100 can generate a control instruction for the traffic light. The control instruction can be a crossing instruction if the crossing condition is met, or can be an alerting instruction if otherwise. The two branches of the method can be described in detail in the following S203-S204 (the crossing instruction branch) and S205-S206 (the alerting instruction branch).

S203: generating a crossing instruction;

Specifically, if S202 determines that the crossing condition is met (i.e. the traffic flow data is lower than, or equal to, the flow threshold), the traffic light control device 100 executes S203 to generate a crossing instruction.

S204: the crossing instruction controlling the traffic light 10 to allow the vehicle to cross through the intersection.

Specifically, upon receiving the crossing instruction, the traffic light control device 100 executes S204 to control the traffic light 10 to allow the vehicle to cross through the intersection. For example, the traffic light 10 can be controlled to turn from red or yellow to green if the traffic light 10 is originally red, or can be maintained as green if the traffic light 10 is originally green.

As such, during the night, when a driver drives a vehicle to an intersection, if there are no vehicles/pedestrians on the second road that crosses the driving road of the vehicle at the intersection, the vehicle-mounted signal processing device 200 disposed on the vehicle can transmit a crossing request to the traffic light control device 100. Upon receiving the crossing request, the traffic light control device 100 can then determine whether a crossing condition is met based on the traffic status at the intersection.

If the crossing condition is met, the traffic light control device 100 can generate, and send to the traffic light 10, a crossing instruction. Upon receiving the crossing instruction, the traffic light 10 can turn from red to green if it is originally red, or can maintain as green if it is originally green.

Thus, the traffic light can allow the vehicle to pass through the intersection based on a crossing request from the driver, without the need to spend a relatively long waiting time until the traffic light 10 automatically alters. As such, the time for drivers can be saved and the fuel consumption of vehicles can be reduced.

S205: generating an alerting instruction;

Specifically, if S202 determines that the traffic flow data is higher than the flow threshold (i.e. the crossing condition is not met), the traffic light control device 100 generates an alerting instruction.

S206: the alerting instruction controlling the traffic light 10 to flash.

Specifically, the traffic light control device 100 executes step S205 to generate an alerting instruction, which controls the traffic light 10 to flash. For example, the red lamp of the traffic light 10 can be controlled to flash, so as to alert the driver that there are vehicles, pedestrians, or moving living objects on the second road (having direction C) that crosses the driving road (having direction B) at the to-be-crossed intersection A.

As such, the driver can be alerted to wait until the traffic light turns from red to green, and to slowly move the vehicle after the traffic light turns green.

Figure 6:
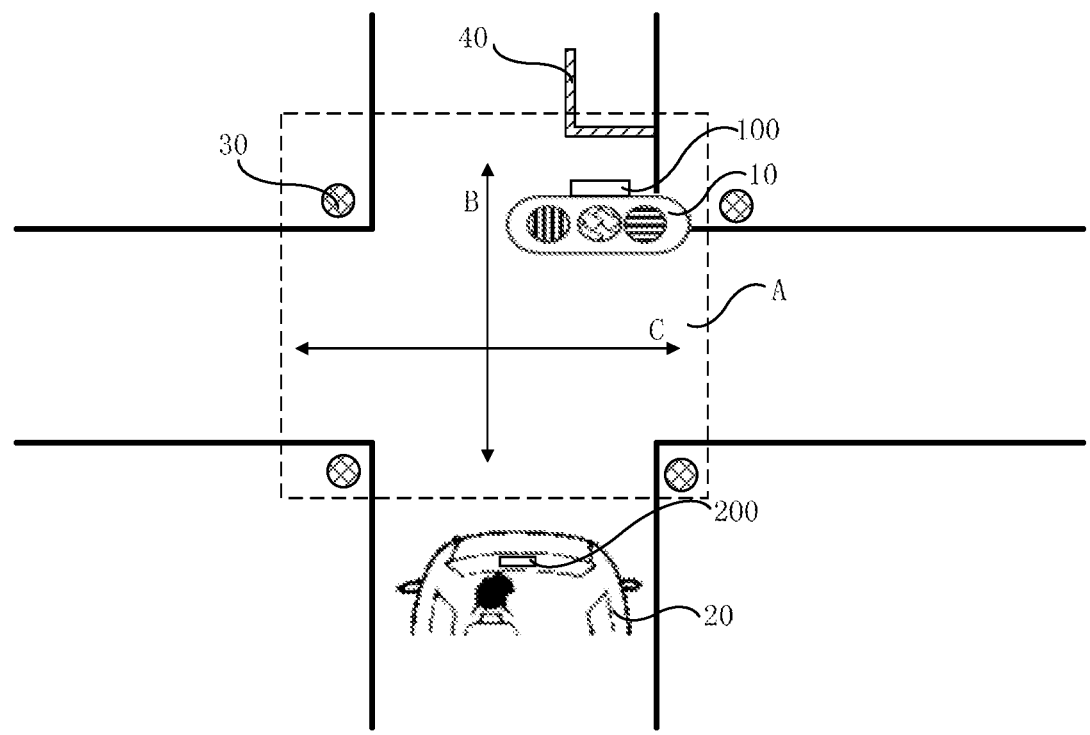
FIG. 6 illustrates a traffic condition having a construction enclosing wall at a to-be-crossed intersection.

In a second embodiment of the traffic light control method, the traffic status can include traffic block data. For example, the traffic block data can be data of whether there is a construction enclosing wall 40 on a road having a same direction as the driving direction B at the to-be-crossed intersection A, as shown in FIG. 6. Herein the data of construction enclosing wall 40 is substantially the data regarding construction sites on the traffic road.

Figure 7:
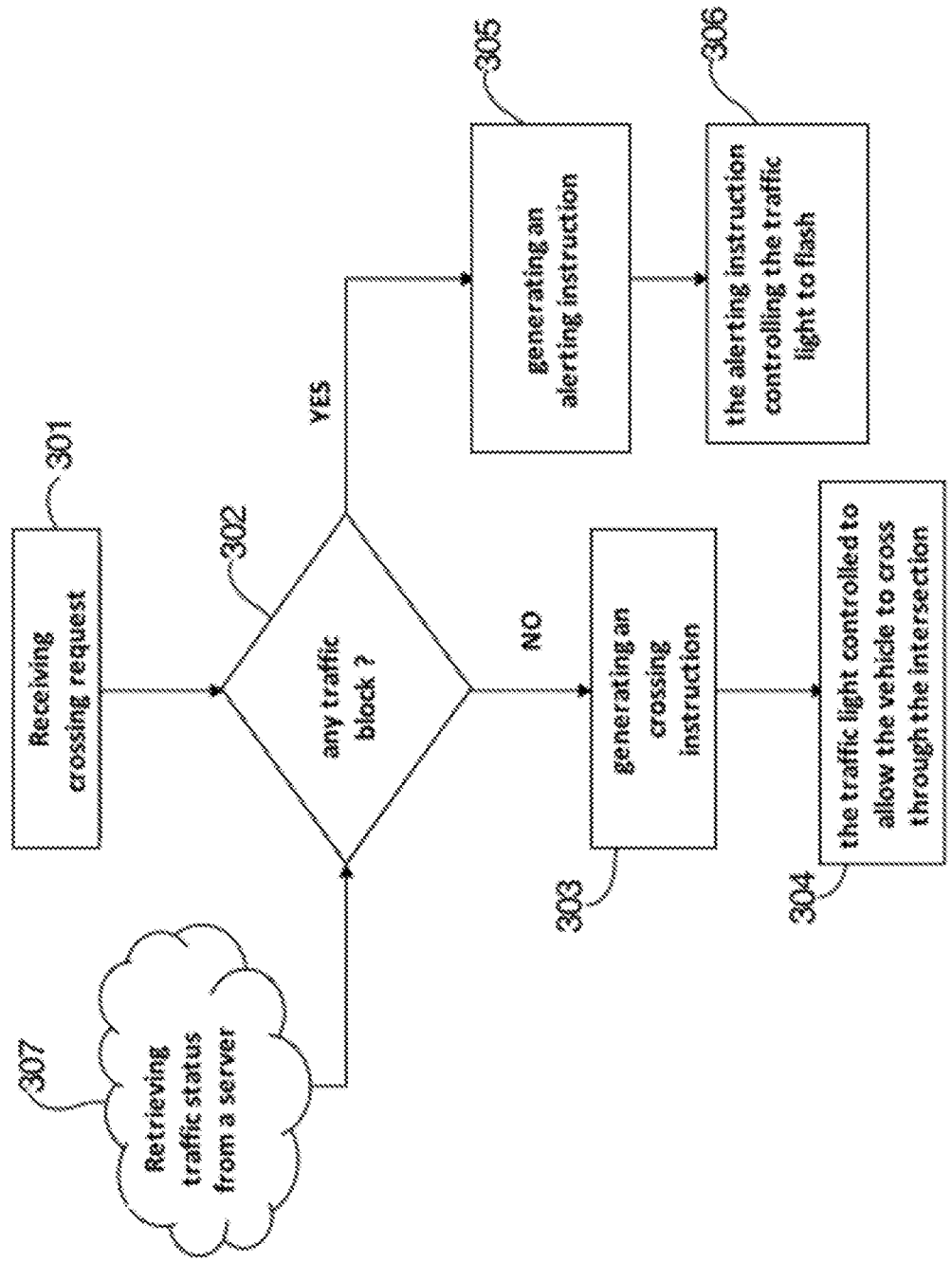
FIG. 7 is a flow chart of a traffic light control method illustrated in FIG. 1 where the traffic status includes data of at least one construction enclosing wall.

In this second embodiment, the traffic light control method can have the following steps, as illustrated in FIG. 7.

S301: Receiving the crossing request;

Herein S301 can be the same as S201 in the aforementioned first embodiment of the traffic light control method. The details are skipped herein.

S302: determining whether there is a traffic block;

Specifically, the traffic light control device 100 determines whether a crossing condition is met. Herein the crossing condition comprises whether there is a traffic block (e.g., at least one construction enclosing wall 40) on a road having a same direction as the driving direction B at the to-be-crossed intersection A. The traffic light control device 100 can then execute step S303 if the crossing condition is met (i.e. there is no traffic block at the to-be-crossed intersection A).

Similar to the first embodiment of the traffic light control method, prior to S302, the traffic light control device 100 can also execute step S307: obtaining the traffic status (i.e. the traffic block data, such as data of a construction enclosing wall 40) at the to-be-crossed intersection A from a server.

Herein the traffic block data at the to-be-crossed intersection A can be collected by a camera disposed at each corner of the to-be-crossed intersection A, and can then be stored in the server.

Based on the determination result of whether there is a traffic block, the traffic light control device 100 can generate a control instruction for the traffic light. The control instruction can be a crossing instruction if the crossing condition is met, or can be an alerting instruction if otherwise. The two branches of the method can be described in detail in the following S303-S304 (the crossing instruction branch) and S305-S306 (the alerting instruction branch).

S303: generating a crossing instruction.

Specifically, if S302 determines that the crossing condition is met (i.e. there is no traffic block), the traffic light control device 100 executes S303.

S304: the crossing instruction controlling the traffic light 10 to allow the vehicle to pass through the intersection.

Specifically, upon receiving the control instruction, the traffic light control device 100 executes S304 to control the traffic light 10 to turn from red or yellow to green if the traffic light 10 is originally red, or to control the traffic light 10 to maintain as green if the traffic light 10 is originally green.

S305: generating an alerting instruction;

Specifically, if S302 determines that there is a traffic block (e.g., at least one construction enclosing wall 40), the traffic light control device 100 generates an alerting instruction.

S306: the alerting instruction controlling the traffic light 10 to flash.

Specifically, the traffic light control device 100 executes step S305 to generate an alerting instruction, which can be configured to control the traffic light 10 to flash. For example, the red lamp of the traffic light 10 can be controlled to flash, so as to alert the driver that there is at least one construction enclosing wall 40 on a road having a same direction as the driving direction B at the to-be-crossed intersection A.

As such, the driver can be alerted to wait until the traffic light turns from red to green, and during this process, the driver can have a better chance to see the at least one construction enclosing wall 40, and can timely drive the vehicle to bypass the at least one construction enclosing wall 40 after the traffic light turns green.

In a third embodiment of the traffic light control method, the traffic status can include an instant time. Herein the instant time is referred to as the time of driving the vehicle.

Figure 8:
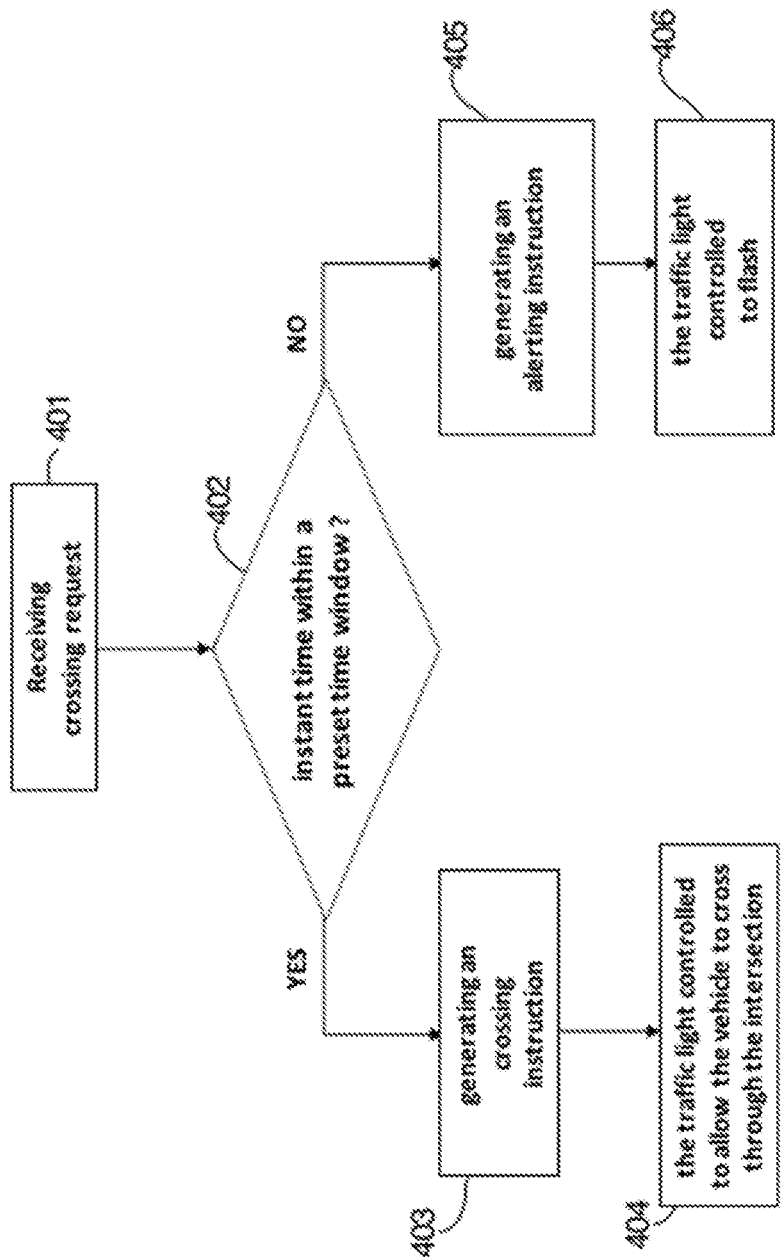
FIG. 8 is a flow chart of the traffic light control method illustrated in FIG. 1 where the traffic status comprises an instant time.

As such, the traffic light control method can comprise the following steps, as shown in FIG. 8.

S401: Receiving the crossing request;

Herein S301 can be the same as S201 in the aforementioned first embodiment of the traffic light control method. The details are skipped herein.

S402: determining whether the instant time is within a time window.

Specifically, the traffic light control device 100 can determine whether a crossing condition at the to-be-crossed intersection is met. Herein the crossing condition can comprise whether the instant time is within a time window. The traffic light control device 100 can then execute step S403 if the crossing condition is met (i.e. the instant time when the vehicle is driving is within the time window).

Herein the time window can be set depending on practical needs. For example, the time window can be set as 2 am-5 am in a relatively big city when typically the traffic flow reduces significantly at a relatively late time. In contrast, the time window can be set as 0 am-6 am in a relatively small city.

In addition, the time window can be adjusted according to the various traffic flow (including flow of pedestrians and/or flow of vehicles) during holidays. There are no limitations.

Based on the determination result of the instant time, the traffic light control device 100 can generate a control instruction for the traffic light. The control instruction can be a crossing instruction if the crossing condition is met, or can be an alerting instruction if otherwise. The two branches of the method can be described in detail in the following S403-S404 (the crossing instruction branch) and S405-S406 (the alerting instruction branch).

S403: generating a crossing instruction;

Specifically, if S402 determines that the crossing condition is met (i.e. the instant time is within the time window), the traffic light control device 100 executes S403 to thereby generate a crossing instruction.

S404: the crossing instruction controlling the traffic light 10 to allow the vehicle to pass through the intersection.

Specifically, upon receiving the crossing instruction, the traffic light control device 100 executes S404 to control the traffic light 10 to turn from red or yellow to green if the traffic light 10 is originally red, or to control the traffic light 10 to maintain as green if the traffic light 10 is originally green.

S405: generating an alerting instruction;

Specifically, if S402 determines that the instant time is not within the time window, the traffic light control device 100 generates an alerting instruction.

S406: the alerting instruction controlling the traffic light 10 to flash.

Specifically, the traffic light control device 100 executes step S405 to generate an alerting instruction, which controls the traffic light 10 to flash. For example, the red lamp of the traffic light 10 can be controlled to flash, so as to alert the driver that he or she needs to wait until the traffic light turns from red to green, and that he or she needs to slowly start the vehicle after the traffic light turns green.

Figure 9:
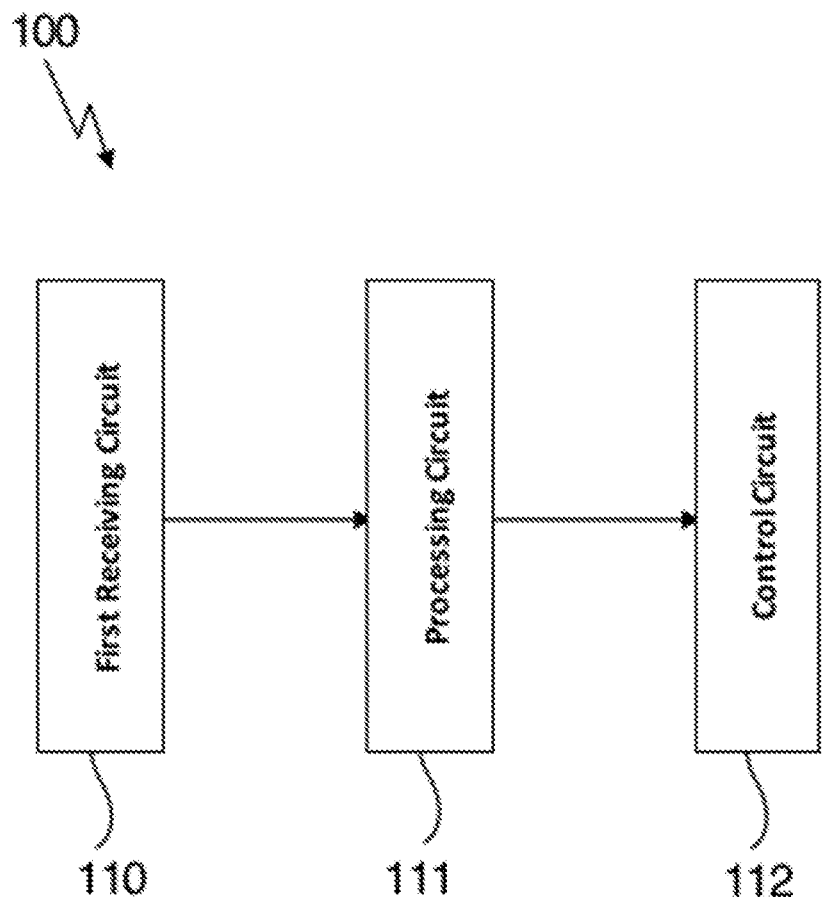
FIG. 9 is a schematic diagram of a traffic light control device according to some embodiments of the present disclosure.

In a second aspect, the present disclosure further provides a traffic light control device 100. As shown in FIG. 9, the traffic light control device 100 comprises the following components.

The traffic light control device 100 can comprise a first receiving circuit 110, which is configured to receive a crossing request from a user terminal.

Herein the user terminal can be a vehicle-mounted signal processing device 200 as shown in FIG. 2 or FIG. 6.

Alternatively, the user terminal can be a mobile phone or a portable device, provided with an application corresponding to the traffic light control device 100 so as to be able to send a crossing request to the first receiving circuit 110.

Specifically, a user can input a crossing request to the user terminal as described above by voice input or handwriting input, and through the user terminal, the crossing request can be transmitted to the first receiving circuit 110 of the traffic light control device 100.

The traffic light control device 100 can further comprise a processing circuit 111, which is configured, upon the crossing request, to determine whether traffic status at the to-be-crossed intersection A meets a crossing condition, and to generate a control instruction based on a determination result of the traffic status.

The control instruction generated by the processing circuit 111 can be a crossing instruction if the traffic status meets a crossing condition, and optionally can be an alerting instruction if the traffic status at the intersection fails to satisfy the crossing condition.

The traffic light control device 100 can further comprise a control circuit 112, which is configured to control the traffic light 10 based on the control instruction. Specifically, the control circuit 112 can control the traffic light to allow the vehicle to cross through the intersection upon receiving a crossing instruction, or can control the traffic light to flash upon receiving an alerting instruction.

Thus in the traffic light control device as described above, after a first receiving circuit receives a crossing request from a user terminal, a processing circuit makes a judgement based on traffic status of the roads, and then a control circuit controls the traffic light to allow the vehicle to cross through the intersection if the traffic status meets a crossing condition, or controls the traffic light to flash if otherwise.

As such, the traffic light control device can be used to control the traffic light based on the traffic status of the roads, thereby allowing an increasing extent to which the traffic light matches the traffic status, in turn resulting in shortened waiting time and reduced fuel consumption.

On the above basis, as shown in FIG. 2 or FIG. 6, corners of the to-be-crossed intersection A can be provided with data collectors 30, and each data collector 30 can collect the traffic status at the to-be-crossed intersection A and can then output the traffic status to a server 120 that is disposed in a traffic management agency. Such an arrangement allows the police to know the traffic status of the roads.

Figure 10:
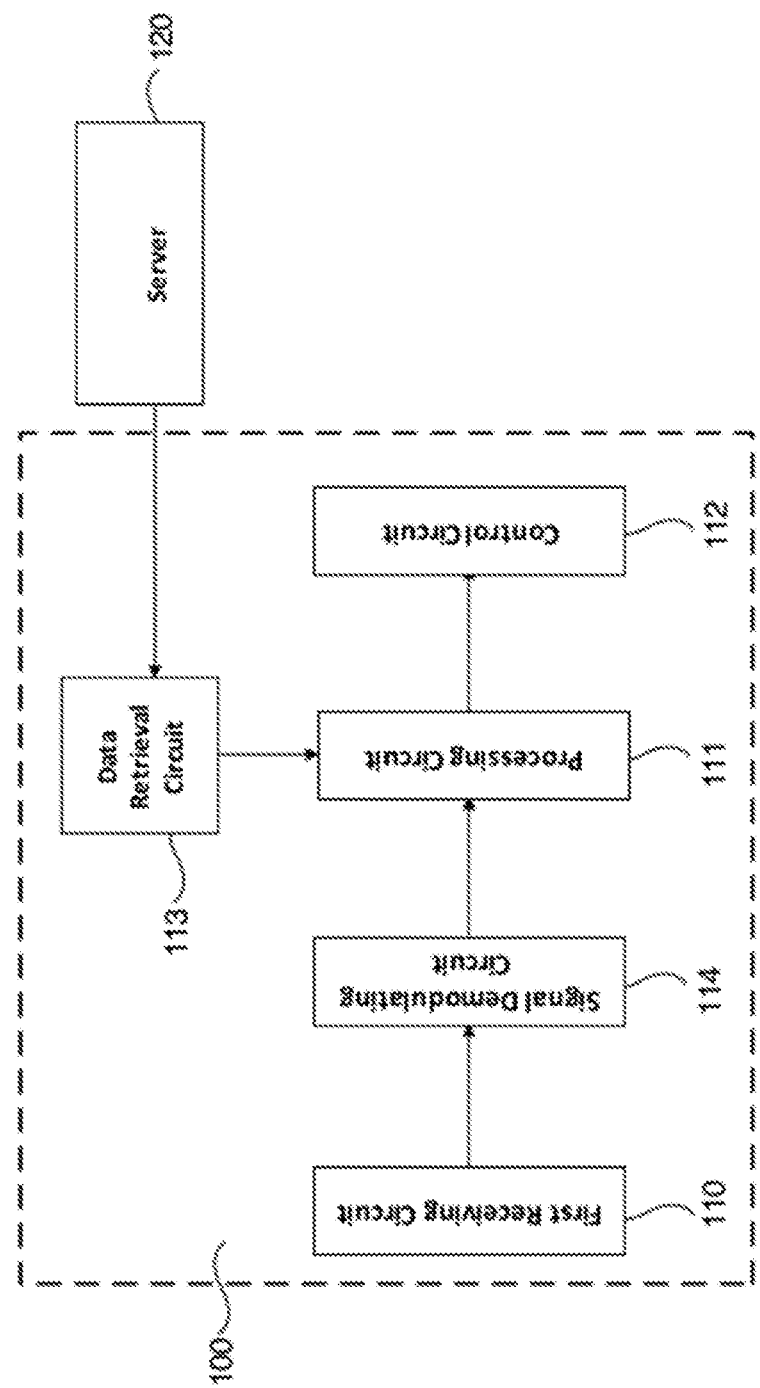
FIG. 10 is a schematic diagram of the structure of a traffic light control device connecting to a server.

As such, the traffic light control device 100 can further include a data retrieval circuit 113, as shown in FIG. 10, which is configured to retrieve the traffic status at the to-be-crossed intersection A from a server 120, thereby allowing the processing circuit 111 to determine whether the retrieved traffic status meets the crossing condition.

Because the user terminal may modulate the crossing request before transmission of the crossing request to the traffic light control device 100, in some embodiments of the present disclosure, the traffic light control device 100 can further comprise a signal demodulating circuit 114, which is configured to demodulate the crossing request that has been received to thereby reduce the transmission signal to the baseband signal so as to allow subsequent processing of the baseband signal.

In a third aspect, the present disclosure further provides a traffic light control system.

Figure 11:
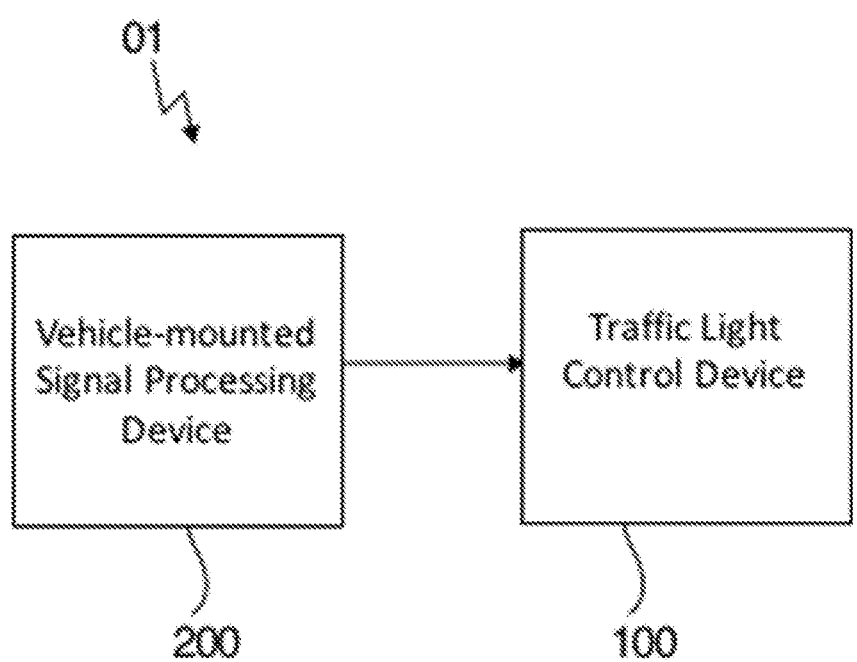
FIG. 11 is a schematic diagram of a traffic signal control system according to some embodiments of the present disclosure.

As shown in FIG. 11, the traffic light control system 01 comprises a traffic light control device 100 according to any of the embodiments as described above, and a vehicle-mounted signal processing device 200. The vehicle-mounted signal processing device 200 is configured to transmit a crossing request to the traffic light control device 100.

Figure 12:
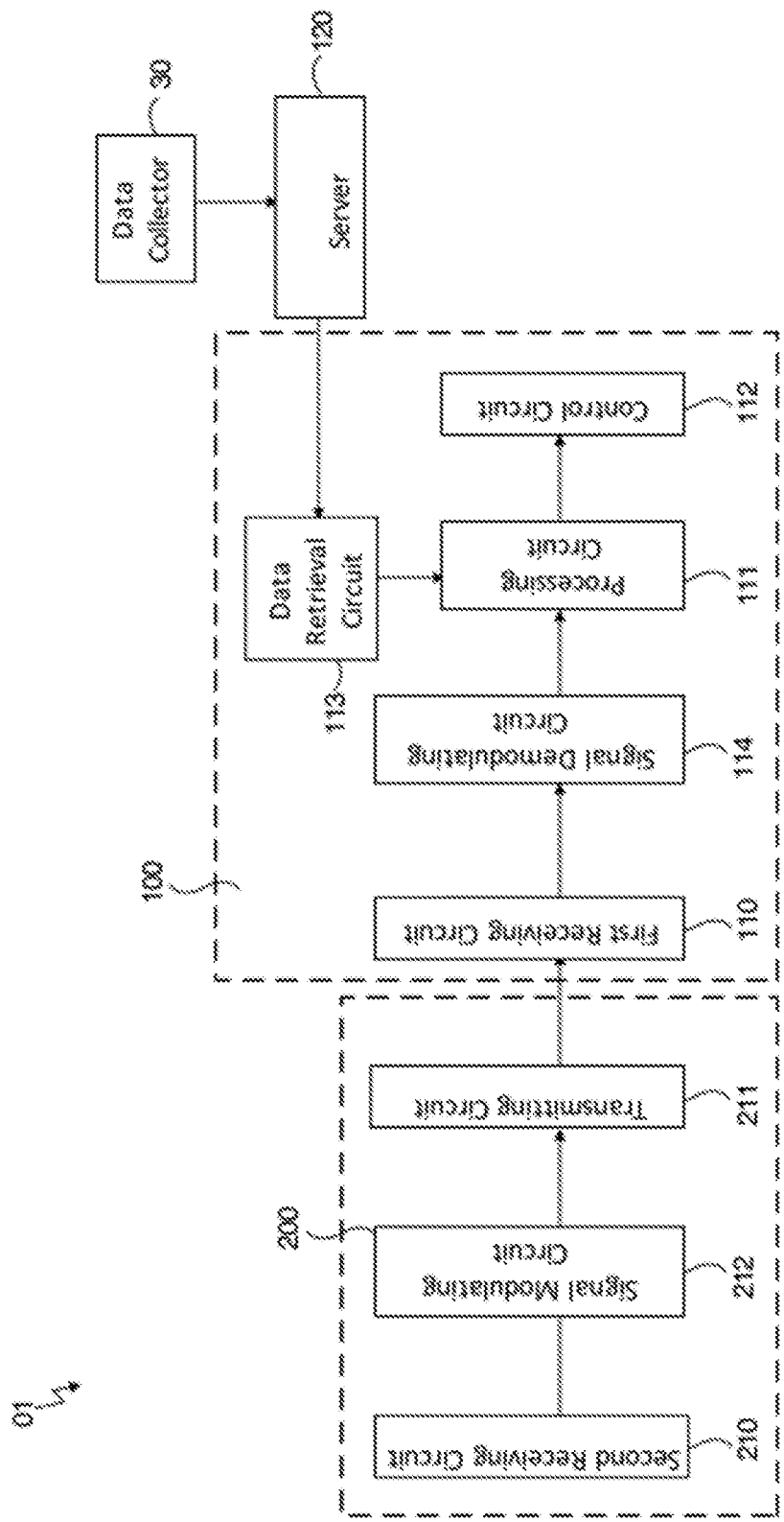
FIG. 12 is a schematic diagram of a traffic signal control system according to some other embodiments of the present disclosure.

As shown in FIG. 12, the vehicle-mounted signal processing device 200 can comprise a second receiving circuit 210, which is configured to receive a crossing request sent by the user. Specifically, the user can send the crossing request by voice input or handwriting input.

In addition, the vehicle-mounted signal processing device 200 can further comprise a transmitting circuit 211, which is configured to transmit the crossing request that has been received to the traffic light control device 100.

Herein the transmitting circuit 211 can transmit the crossing request to the traffic light control device 100 via a wireless communication. When the driver is driving the vehicle during night, the transmitting circuit 211 can include a headlamp controller, which is configured to control light emitted from the headlamps of the vehicle 20 to twinkle at a preset twinkle frequency. The preset twinkle frequency is configured to correspond to the crossing request.

In order to ensure a satisfactory transmission effect of the crossing request from the vehicle-mounted signal processing device 200 to the traffic light control device 100, preferably the crossing request can be modulated before transmission. As such, the vehicle-mounted signal processing device 200 can further comprise a signal modulating circuit 212, which is configured to modulate the crossing request sent out by the user. There are no limitations on the approaches for modulation.

In order for the traffic management agency to know the traffic status of the roads and to timely handle traffic congestion, the traffic light control system 01 can comprise a server 120, which is configured to remotely store the traffic status of the roads. In some other embodiments, the server can be in a cloud, or can be a local server or a local computer.

In some embodiments of the present disclosure, the traffic light control system 01 can further comprise at least one data collector 30, which is configured to collect traffic status at the intersection provided with the traffic light 10, and then to transmit the traffic status to the server 120. Specifically, the at least one data collector 30 can be disposed at corners of the to-be-crossed intersection A, as shown in FIG. 2 or FIG. 6, and can collect the traffic status at the to-be-crossed intersection A.

Herein each of the at least one data collector 30 can be a camera. Because typically the bigger the diameter Φ the lens in the camera, the larger the detection range H, thus a camera having a relatively big diameter Φ of the lens can preferably be disposed to collect the traffic status at the intersections to thereby improve the safety and reliability of the traffic light control system as disclosed herein.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for controlling a traffic light at an intersection, comprising:
    receiving a crossing request from a vehicle approaching the intersection on a first road;
    determining whether traffic status at the intersection satisfies a crossing condition, wherein the traffic status comprises traffic flow data on a second road crossing the first road at the intersection;
    determining whether the traffic flow data is lower than, or equal to, a flow threshold; and
    controlling the traffic light based on a determination result of the traffic status;
    wherein the determining whether traffic status at the intersection satisfies a crossing condition comprises:
    determining whether there is a construction traffic block on the first road passing the intersections;
    wherein the traffic status further comprises at least one of:
    traffic block data on the first road passing the intersection; or
    instant time;
    wherein:
    the traffic status comprises traffic block data on the first road passing the intersection; and
    the traffic block data comprise information on a construction enclosing wall having a same direction as a driving direction of the vehicle;
    the method further comprising:
    controlling the traffic light to flash to thereby alert a driver of the vehicle of the construction enclosing wall.

2. The method of claim 1, wherein the controlling the traffic light based on a determination result of the traffic status comprises:
    controlling the traffic light to allow the vehicle to pass through the intersection on the first road if the traffic status at the intersection satisfies the crossing condition.

3. The method of claim 2, wherein the controlling the traffic light to allow the vehicle to pass through the intersection on the first road if the traffic status at the intersection satisfies the crossing condition comprises:
    maintaining the traffic light as green if the traffic light is green; or
    altering the traffic light to become green if the traffic light is red.

4. The method of claim 2, wherein the controlling the traffic light based on a determination result of the traffic status further comprises:
    alerting the traffic light to flash if the traffic status at the intersection fails to satisfy the crossing condition.

5. The method of claim 1, wherein the crossing request is transmitted from the vehicle via optical communication, and the receiving a crossing request from a vehicle approaching the intersection on a first road comprises:
    detecting an optical signal transmitted from the vehicle; and
    determining the crossing request based on the optical signal.

6. The method of claim 5, wherein:
    the detecting an optical signal transmitted from the vehicle comprises:
    detecting a light emitted from at least one headlamp of the vehicle; and
    the determining the crossing request based on the optical signal comprises:

determining the crossing request based on the light, wherein a twinkle frequency of the light corresponds to the crossing request.

7. The method of claim 5, wherein the crossing request comprises a modulated signal, and the method further comprises, between the receiving a crossing request from a vehicle approaching the intersection on a first road and the determining whether traffic status at the intersection satisfies a crossing condition:
demodulating the crossing request.

8. A method for controlling a traffic light at an intersection, comprising:
receiving a crossing request from a vehicle approaching the intersection on a first road;
determining whether traffic status at the intersection satisfies a crossing condition, wherein the traffic status comprises traffic flow data on a second road crossing the first road at the intersection;
determining whether the traffic flow data is lower than, or equal to, a flow threshold; and
controlling the traffic light based on a determination result of the traffic status;
wherein the traffic status comprises instant time, and the determining whether traffic status at the intersection satisfies a crossing condition comprises:
determining whether the instant time is within a time window;
wherein the time window is a fixed time period based on a time of a night or day.

9. The method of claim 8, wherein the time window is 2 am - 5 am in a first city, or 12 am - 6 am in a second city smaller than the first city.

10. A traffic light control device, configured to control a traffic light at an intersection, comprising a first receiving circuit, a processing circuit, and a control circuit, wherein:
the first receiving circuit is configured to receive a crossing request from a vehicle approaching the intersection on a first road;
the processing circuit is configured, upon the crossing request, to determine whether traffic status at the intersection satisfies a crossing condition, and to generate a control instruction based on a determination result of the traffic status, wherein the traffic status comprises traffic flow data including construction block data on a second road crossing the first road at the intersection; and wherein the processing circuit is further configured to determine whether the traffic flow data is lower than, or equal to, a flow threshold; and
the control circuit is configured to control the traffic light based on the control instructions;
wherein the traffic status further comprises instant time, and the processing circuit is further configured to determine whether traffic status at the intersection satisfies a crossing condition based on:
determining whether the instant time is within a time window;
wherein the time window is a fixed time period based on a time of a night or day.

11. The traffic light control device according to claim 10, wherein the control instruction generated by processing circuit comprises a crossing instruction configured to allow the vehicle to pass through the intersection if the traffic status at the intersection satisfies the crossing condition.

12. The traffic light control device according to claim 11, wherein the control circuit is configured, based on the crossing instruction:

to maintain the traffic light as green if the traffic light is green; and
to alter the traffic light to become green if the traffic light is red.

13. The traffic light control device according to claim 10, wherein the control instruction generated by processing circuit comprises an alerting instruction configured to alert if the traffic status at the intersection fails to satisfy the crossing condition.

14. The traffic light control device according to claim 13, wherein the control circuit is configured to alert the traffic light to flash based on the alerting instruction.

15. The traffic light control device according to claim 10, wherein the first receiving circuit comprises an optical sensing sub-circuit, configured to detect an optical signal transmitted from the vehicle to thereby obtain the crossing request.

16. The traffic light control device according to claim 15, wherein the optical signal transmitted from the vehicle comprises a light emitted from at least one headlamp of the vehicle, wherein a twinkle frequency of the light corresponds to the crossing request.

17. The traffic light control device according to claim 15, further comprising a signal demodulating circuit, configured to demodulate the crossing request to thereby generate a demodulated crossing request after detecting the optical signal and before processing by the processing circuit.

18. The traffic light control device according to claim 10, further comprising a data retrieving circuit, configured to retrieve data of the traffic status at the intersection from a server.

19. A traffic light control system, comprising a traffic light control device according to claim 10.

20. The traffic light control system according to claim 19, further comprising a signal processing device, mounted on the vehicle and configured to receive the crossing request from a user and to transmit the crossing request to the traffic light control device.

21. The traffic light control system according to claim 20, wherein the signal processing device comprises:
a second receiving circuit, configured to receive the crossing request from the user; and
a transmitting circuit, configured to transmit the crossing request to the traffic light control device.

22. The traffic light control system according to claim 20, further comprising a user terminal, configured for the user to send the crossing request to the signal processing device.

23. The traffic light control system according to claim 21, wherein the signal processing device further comprises a signal modulating circuit, configured to modulate the crossing request to thereby generate a modulated crossing request before transmission by the transmitting circuit.

24. The traffic light control system according to claim 21, wherein the transmitting circuit comprises an optical signal controller, configured to control an optical signal transmitted from the vehicle, wherein the optical signal encodes the crossing request.

25. The traffic light control system according to claim 24, wherein the optical signal controller comprises a headlamp controller, configured to control a light emitted from at least one headlamp of the vehicle to twinkle at a twinkle frequency, wherein the twinkle frequency corresponds to the crossing request.

26. The traffic light control system according to claim 19, further comprising a server, configured to store the traffic status.

27. The traffic light control system according to claim 26, further comprising a data collector, each configured to collect data of the traffic status at the intersection and to transmit the traffic status to the server.

28. The traffic light control system according to claim 26, wherein the server is in a cloud.

\* \* \* \* \*